US012338804B2

(12) United States Patent
Randell

(10) Patent No.: US 12,338,804 B2
(45) Date of Patent: Jun. 24, 2025

(54) APPARATUS FOR IONIZING AND ACCELERATING A FLUID

(71) Applicant: Sarantis Logothetis Randell, Winnipeg (CA)

(72) Inventor: Sarantis Logothetis Randell, Winnipeg (CA)

(*) Notice: Subject to any disclaimer, the term of this patent is extended or adjusted under 35 U.S.C. 154(b) by 0 days.

(21) Appl. No.: 18/257,061

(22) PCT Filed: Dec. 13, 2021

(86) PCT No.: PCT/CA2021/051788
§ 371 (c)(1),
(2) Date: Jun. 12, 2023

(87) PCT Pub. No.: WO2022/120499
PCT Pub. Date: Jun. 16, 2022

(65) Prior Publication Data

US 2024/0060481 A1 Feb. 22, 2024

(30) Foreign Application Priority Data

Dec. 13, 2020 (CA) ................................ CA 3102563

(51) Int. Cl.
*F03H 1/00* (2006.01)

(52) U.S. Cl.
CPC .................................. *F03H 1/0037* (2013.01)

(58) Field of Classification Search
CPC ............................. F03H 1/0043; F03H 1/0037
See application file for complete search history.

(56) References Cited

U.S. PATENT DOCUMENTS 3,130,945 A * 4/1964 De Seversky ........ B64C 23/005 244/62
2006/0283171 A1 12/2006 Metcalfe, III et al.
2014/0109549 A1 4/2014 Stickelmaier et al.
2019/0152625 A1* 5/2019 Krauss .................. F03H 1/0043

FOREIGN PATENT DOCUMENTS

CN 101 381 005 A 3/2009
FR 2717865 A1 * 9/1995 ............. B64G 1/405

OTHER PUBLICATIONS

Berkely Labs "TE Connectivity Uses ALS to Improve Conductive Plastics". (Year: 2018).*

* cited by examiner

*Primary Examiner* — David P. Olynick
(74) *Attorney, Agent, or Firm* — Adrian D. Battison; Ade & Company Inc.; Kyle R. Satterthwaite

(57) ABSTRACT

An apparatus for ionizing and accelerating a fluid comprises at least a pair of spaced-apart electrodes arranged coaxially and each comprising a planar, electrically conductive body locating a plurality of apertures arranged to substantially uniformly distribute electric charge across the body and to permit passage of the particles of the fluid therethrough. At least a leading one of the electrodes of the adjacent pair includes one or more electrically conductive projections electrically coupled to and extending generally axially in a common direction from a common side of the electrode body. The projections are arranged at spaced locations on the side of the electrode body. The projections of the leading electrode point towards a trailing one of the electrodes and define a direction of movement of the fluid.

5 Claims, 8 Drawing Sheets

APPARATUS FOR IONIZING AND ACCELERATING A FLUID

This application is a national phase filing of PCT/CA2021/051788 and claims priority from Canadian patent application ser. no. 3,102,563 filed Dec. 13, 2020.

FIELD OF THE INVENTION

The present invention relates to an apparatus for ionizing and accelerating a fluid, and more particularly to such an apparatus comprising a plurality of electrodes having perforated electrically conductive bodies and one or more electrically conductive projections electrically coupled to the body of at least one of the electrodes.

BACKGROUND

It is generally known that a fluid can be ionized and accelerated using an electrode pair disposed in the fluid in spaced apart relation and connected to a voltage source to generate an electrical field therebetween. Furthermore, such an electrode pair can be adapted for mounting to a body to generate motive thrust to propel the body.

In a conventional arrangement therefor, a leading one of the electrodes, relative to a direction of movement of the fluid, comprises one or more projections pointing towards a trailing one of the electrodes. The projections, which form tips smaller than their bases connected to a main body of the electrode that is electrically connected to the voltage source, act to localize electric discharge between the electrode pair for ionizing and accelerating the fluid. The trailing electrode locates a plurality of apertures arranged to permit passage of the particles of the fluid therethrough. However, the leading and trailing electrodes do not share common features, that is the leading electrode does not have apertures therein and the trailing electrode does not have projections.

SUMMARY OF THE INVENTION

According to an aspect of the invention there is provided an apparatus for ionizing and accelerating a fluid comprising:

- a plurality of electrodes arranged to be disposed in the fluid and supported in spaced relation to each other along an axis;
- a voltage source operatively electrically connected to the electrodes to form an electric field therebetween for ionizing particles of the fluid, wherein the voltage source is configured to provide a voltage of a single polarity such that the electric field is unidirectional;
- wherein each of the electrodes comprises a planar, electrically conductive body having a first side and a second side and locating a plurality of apertures arranged to substantially uniformly distribute electric charge across the body and to permit passage of the particles of the fluid therethrough;
- wherein the planar bodies of the electrodes are arranged in parallel relation to each other and perpendicularly transversely to the axis;
- wherein at least one of the electrodes of each adjacent pair of the electrodes respectively further includes one or more electrically conductive projections electrically coupled to and extending generally axially in a common direction from the first side of the body thereof to tips of the projections disposed in spaced relation to the first side, wherein the projections are arranged at spaced locations on the first side of the body of the electrode;
- wherein the projections of the electrodes point in a common axial direction defining a direction of movement of the fluid; and
- wherein an upstream-most one of the electrodes, relative to the direction of movement of the fluid, comprises one or more of the projections.

This arrangement is suited for accelerating the fluid to generate a motive force for propelling a body to which the apparatus is mounted. The one or more electrodes with projections pointed in a common axial direction cooperate to accelerate the fluid between each adjacent pair of the electrodes.

Preferably, when a downstream-most one of the electrodes is free of the projections, an upstream adjacent one of the electrodes includes one or more of the projections.

In one arrangement, all of the electrodes comprise one or more of the projections.

Preferably, the voltage source is configured to provide, for each adjacent pair of the electrodes, a voltage rise from an upstream one of the electrodes of the pair to a downstream one of the electrodes of the pair.

Preferably, the electrodes are supported in spaced relation to each other by electrically insulating posts bridging between respective ones of a pair of the electrodes, wherein the posts are disposed at spaced locations around peripheries of the bodies of the electrodes.

Preferably, the peripheries of the bodies of the electrodes are substantially uninterrupted between each adjacent pair of the posts.

Thus, the posts minimally affect or disturb distribution of charge across each electrode body.

In one arrangement, the body of each electrode is polygonal in shape, and the bodies of the electrodes are angularly misaligned about the axis. When the electrodes are supported in spaced relation to each other using the electrically insulating posts, and particularly when the posts are located at corners of electrode bodies, this misalignment acts to further reduce disturbance to charge distribution attributable to the posts.

In one such arrangement, the bodies of the electrodes are misaligned by about 45 degrees.

In one arrangement, the projections are made of material adapted for triboelectric charging.

In one arrangement, the projections are made of electrically conductive plastic.

According to an aspect of the invention there is provided an apparatus for ionizing and accelerating a fluid comprising:

- a pair of electrodes arranged to be disposed in the fluid and supported in spaced relation to one another along an axis;
- a voltage source operatively electrically connected to the pair of electrodes to form an electric field therebetween for ionizing particles of the fluid, wherein the voltage source is configured to provide a voltage of a single polarity such that the electric field is unidirectional;
- wherein each one of the electrodes comprises a planar, electrically conductive body having a first side and a second side and locating a plurality of apertures arranged to substantially uniformly distribute electric charge across the body and to permit passage of the particles of the fluid therethrough;

wherein the bodies of the electrodes are arranged in parallel relation to one another and perpendicularly transversely to the axis; and wherein a leading one of the electrodes further includes one or more electrically conductive projections electrically coupled to and extending generally axially in a common direction from the first side of the body to tips of the projections disposed in spaced relation to the first side, wherein the projections are arranged at spaced locations on the first side of the electrode; and wherein the projections of the leading electrode point towards a trailing one of the electrodes and define a direction of movement of the fluid.

This arrangement is suited for coaxial stacking multiple electrodes of a common structure to amplify the acceleration of the fluid.

In one arrangement, the trailing electrode also includes one or more of the projections pointed in a common axial direction as the projections of the leading electrode.

Preferably, a negative terminal of the voltage source is electrically connected to a leading one of the pair of electrodes relative to the direction of movement of the fluid, and a positive terminal of the voltage source is electrically connected to a trailing one of the pair of electrodes relative to the direction of movement of the fluid.

In one arrangement, when the pair of electrodes form a cell, the apparatus includes a plurality of the cells in coaxial alignment and with the projections thereof pointed in the common axial direction.

In one such arrangement, when each cell also includes the voltage source which is distinct therefor, polarities of the voltage sources are oriented in a common direction.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

The accompanying figures show arrangements of an apparatus for ionizing and accelerating a fluid, for example air. The apparatus is particularly but not exclusively suited for generating propulsive thrust to propel a body through the fluid. As such, typically, the apparatus is arranged for mounting to a body to be moved, for example a vehicle configured for carrying cargo or passengers.

Generally speaking, and with reference to a first arrangement indicated at 10, the apparatus comprises a plurality of electrodes, such as those indicated at 12, 13, arranged to be disposed in the fluid and supported in spaced relation to each other along an axis 15, and a voltage source 17 (schematically shown) operatively electrically connected to the electrodes 12, 13 to form an electric field therebetween for ionizing particles of the fluid. The voltage source 17 is configured to provide a voltage of a single polarity such that the electric field is unidirectional. Although the polarity is constant or fixed, that it is not variable, the magnitude of the voltage of the source 17 may vary with time, that is a value of the voltage, which the source 17 is configured to provide, is not necessarily constant.

Figure 1:
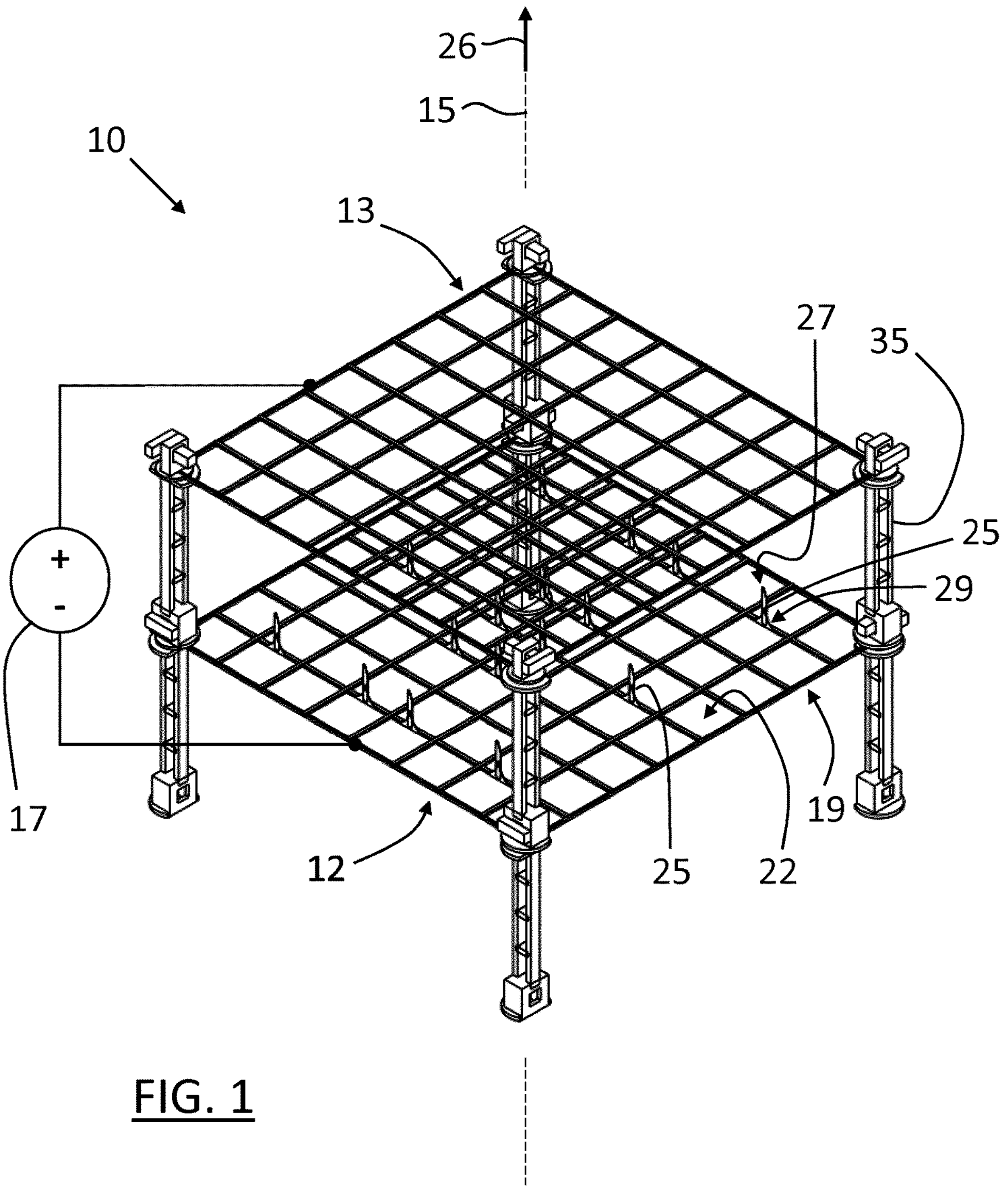
FIGS. 1-3 are perspective, elevational and top plan views, respectively, of a first arrangement of apparatus according to the present invention, where some components are omitted for clarify of illustration in FIG. 3.
Figure 2:
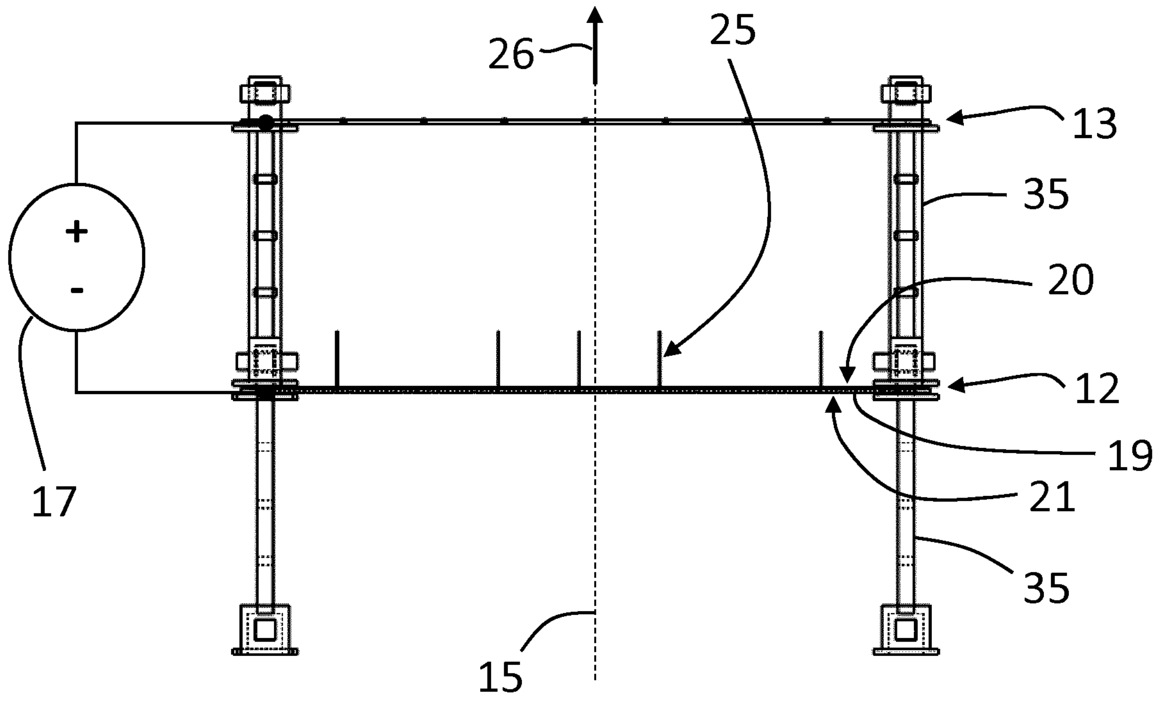
Figure 3:
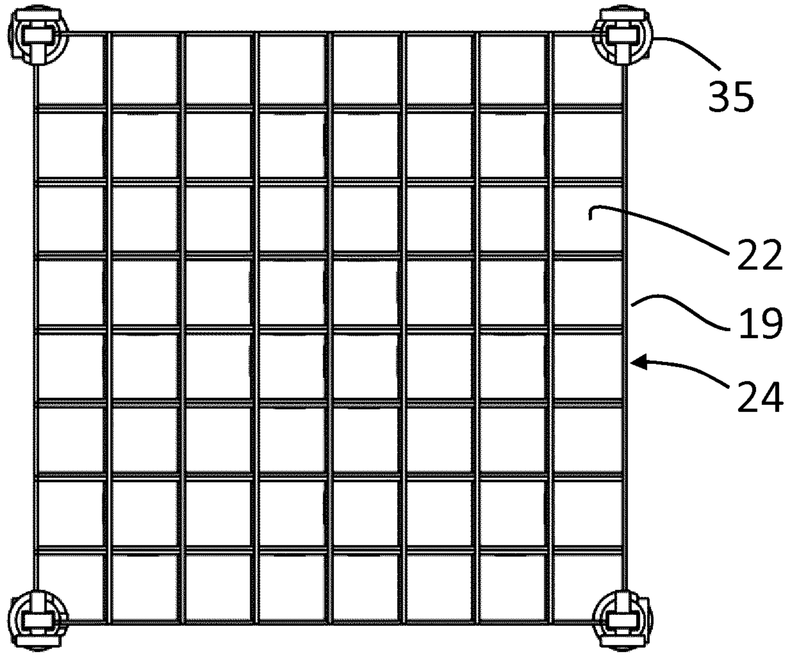
Figure 4:
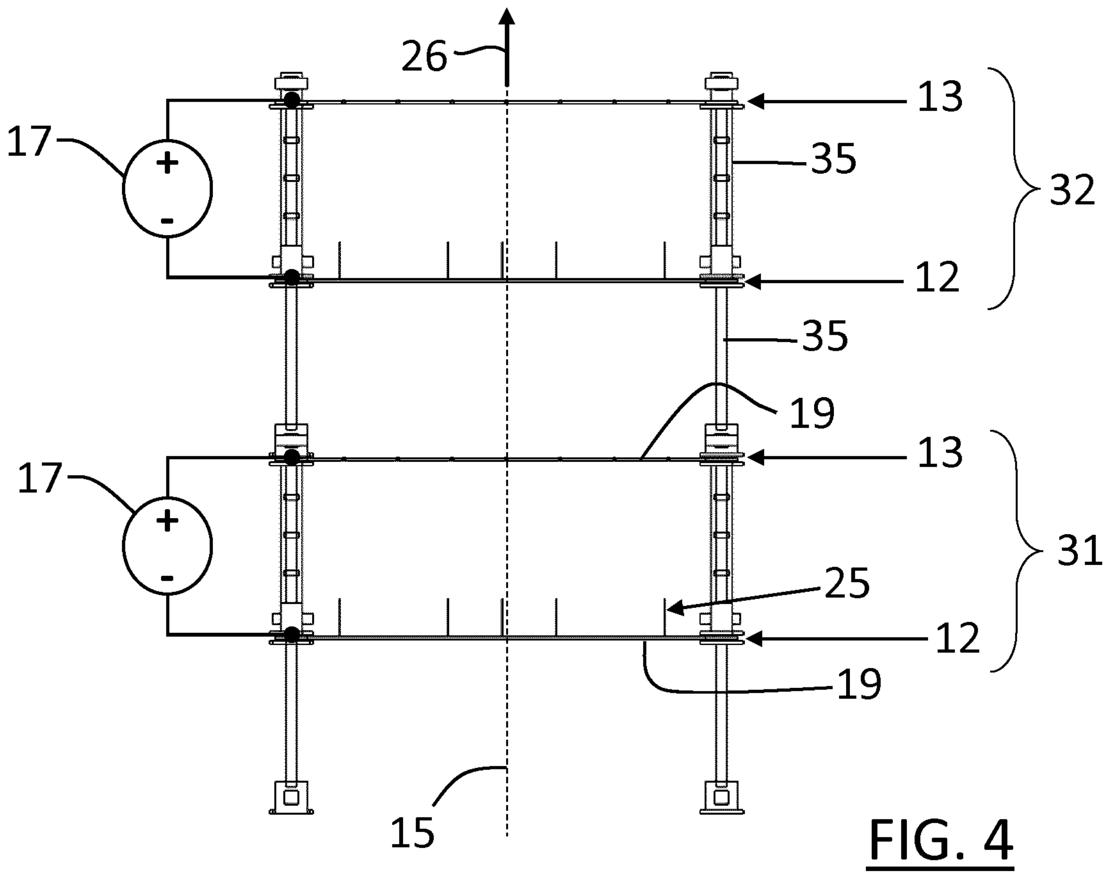
FIG. 4 is an elevational view of a second arrangement of apparatus according to the present invention.
Figure 5:
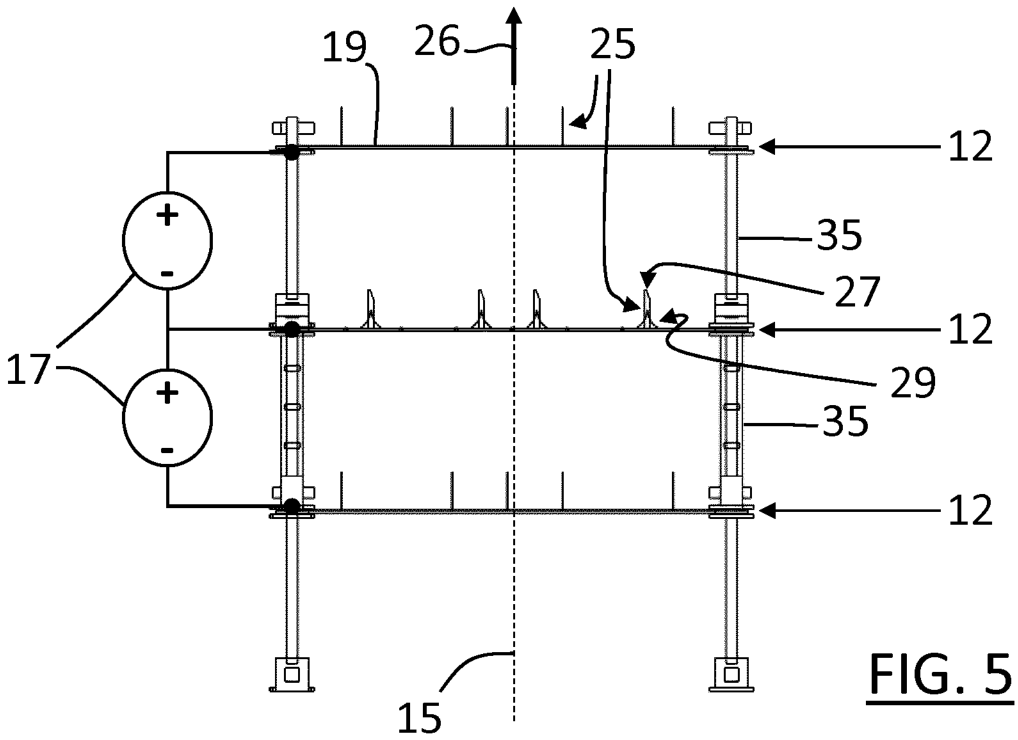
FIG. 5 is an elevational view of a third arrangement of apparatus according to the present invention.

At minimum, the apparatus 10 has two electrodes forming a pair of electrodes, such as 12 and 13 in FIG. 1, but may have more electrodes as shown in FIGS. 4 and 5 with either an odd or even total number of electrodes. Regardless of the total number of electrodes, the electrodes cooperate in pairs to ionize and accelerate the fluid, which will be better appreciated shortly.

Each electrode 12, 13 comprises a planar, electrically conductive body 19 having a first side 20 and a second side 21 and locating a plurality of apertures 22. The apertures 22 are arranged to substantially uniformly distribute electric charge across the body 19 and to permit passage of the particles of the fluid therethrough. The apertures 22 are formed from the first side 20 to the second side 21 of the body 19 across a thickness thereof.

To achieve substantially uniform electric charge distribution upon application of the electric field thereon, the apertures 22 are, for example, arranged at uniformly spaced locations on the body 19 and are of substantially the same size. In other words, the apertures 22 are arranged in a uniform array such that the body 19 of each electrode is in the form of a grid or mesh. In the illustrated arrangements, the apertures 22 collectively occupy between about 50% and about 95% of a total area bounded by a periphery 24 of the body.

To conduce formation of a substantially uniform electric field between each adjacent pair of electrodes, the bodies 19 of the electrodes 12, 13 are arranged in parallel relation to each other so as to be uniformly spaced apart across the surface areas of the electrode bodies, and the electrode bodies 19 are also arranged perpendicularly transversely to the axis 15.

A volume bounded between adjacent electrodes is free of any intervening element and contains only the fluid.

Now, to ionize the fluid, at least one of each adjacent pair of electrodes, such as 12, respectively includes one or more electrically conductive projections 25 electrically coupled to and extending generally axially in a common direction from the first side 20 of the body 19 thereof to tips 27 of the projections disposed in spaced relation to the first side 20, which define respective terminuses of the projections. That is, all of the projections 25 of a common electrode such as 12 point in a common direction 26, generally directed along the axis 15. In the illustrated arrangements, the projections are linear in shape so as to extend along a linear path from their bases 29 connected to the planar body 19 and to the tips 27.

For each electrode 12 with projections, the projections 25 are arranged at spaced locations on the first side 20 of the electrode body 19. Preferably, the projections 25 are spaced equidistantly from each other, from the periphery 24 of the electrode body 19 to which the projections are connected, and from the periphery of an adjacent one of the electrodes in a direction perpendicular or orthogonal to the axis 15. As such, the projections are arranged as far apart from each other and the peripheries of the electrode bodies 19 as is possible given the number of projections.

As more clearly shown in FIG. 5, the tips 27 have smaller surface areas than respective bases 29 of the projections connected to the planar body 19. This is achieved by tapering of the projections 25 in the axial direction from their bases 29 to their tips 27. In other words, a cross-section of the respective projection is wider at the base 29 than at the tip 27.

In order to cooperate to accelerate ionized fluid particles, the projections 25 of the electrodes 12, 13 point in a common axial direction 26 defining a direction of movement of the fluid. Furthermore, an upstream-most one of the electrodes, relative to the direction of movement of the fluid 26, such as electrode 12 in the arrangement of FIG. 1, comprises one or more of the projections 25. As such, the upstream-most adjacent pair of electrodes is configured for ionizing and accelerating the fluid.

In other words, multiple electrodes free of projections cannot be consecutively arranged along the axis 15.

In general, each distinct adjacent pair of electrodes, such as 31 and 32 in FIG. 4, comprises a leading electrode, that is that electrode which is upstream of the other in relation to the direction of movement of the fluid indicated at 26, which has one or more of the projections 25, like the electrode 12. However, when the total number of electrodes is odd, as shown in FIG. 5, then there do not exist a whole number of distinct pairs of adjacent electrodes, so for optimal performance, when a downstream-most one of the electrodes is free of the projections, such as 13 in the arrangement of FIG. 1, an upstream adjacent one of the electrodes, in this case 12, includes one or more of the projections 25. That is, in other words, the penultimate electrode to the downstream-most electrode comprises the projections when the apparatus comprises an odd number of the electrodes.

In some arrangements, such as that shown in FIG. 5, all of the electrodes comprise one or more of the projections 25. Thus, each electrode contributes to ionizing and accelerating the fluid.

To augment a motive force generated as a result of ionizing and accelerating the fluid, the voltage source 17 is configured to provide, for each adjacent pair of the electrodes, a voltage rise from an upstream one of the electrodes of the pair to a downstream one of the electrodes of the pair. When the apparatus comprises a whole number of distinct adjacent pairs of the electrodes, which are referred to as distinct cells, and when each cell comprises a distinct voltage source therefor, as shown in FIG. 4, then usually the foregoing means that a negative terminal of the voltage source is electrically connected to a leading one of the pair of electrodes relative to the direction of movement of the fluid 26, and a positive terminal of the voltage source is electrically connected to a trailing one of the pair of electrodes relative to the direction of movement of the fluid. As such, furthermore, the polarities of the voltage sources are oriented in a common direction.

In the illustrated arrangements, the electrodes 12, 13 are supported in spaced relation to each other by electrically insulating posts 35 bridging between respective ones of a pair of the electrodes. That is, the electrodes are interconnected by the posts 35, which are disposed at spaced locations around the peripheries 24 of the bodies 19 of the electrodes.

Besides the posts, the peripheries of the electrode bodies 19 are substantially uninterrupted between each adjacent pair of the posts connected to a common electrode body. Thus, there is minimal external disturbance on the electric field between adjacent electrodes. Furthermore, the posts 35 minimally affect or disturb distribution of charge across each electrode body.

Figure 6:
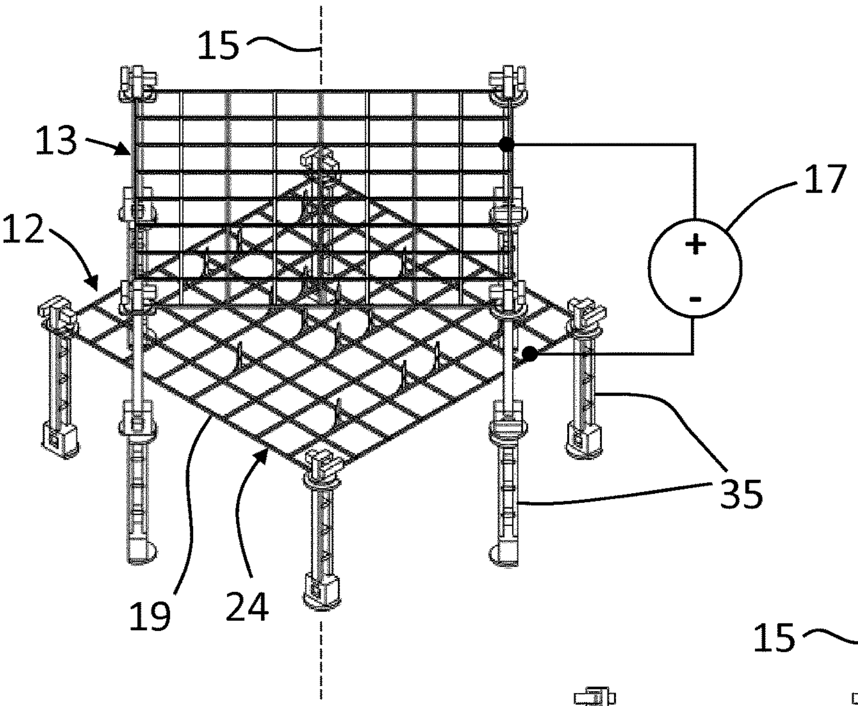
FIGS. 6-8 are perspective, elevational and top plan views, respectively, of a fourth arrangement of apparatus according to the present invention, where some components are omitted for clarify of illustration in FIG. 8.
Figure 7:
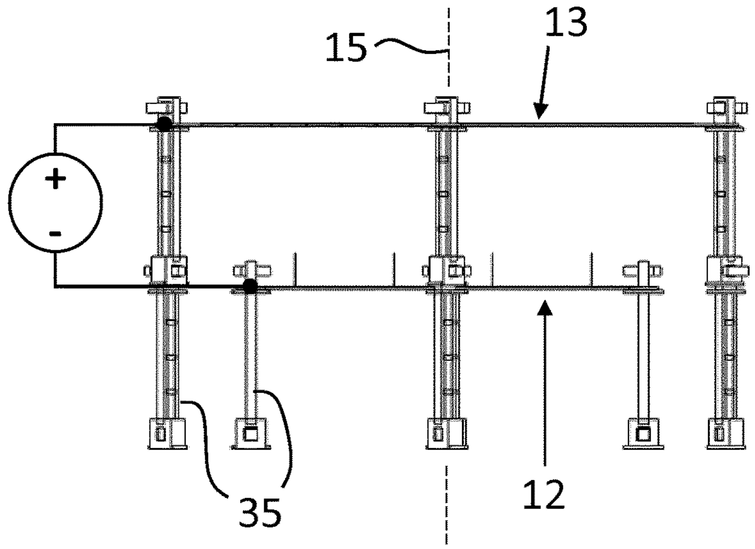
Figure 8:
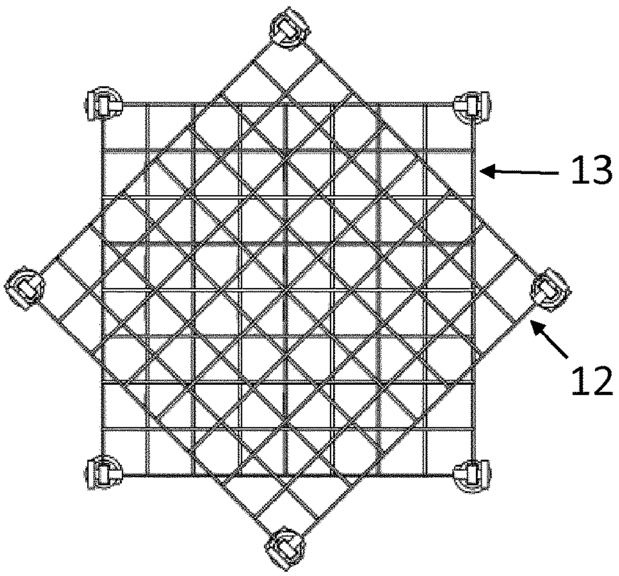

In some arrangements such as that shown in FIGS. 6-8, the body 19 of each electrode is polygonal in shape, that is its periphery 24 is polygonal, for example rectangular as in the illustrated arrangements, and the bodies of the electrodes are angularly misaligned about the axis 15, preferably by about 45 degrees. This reduces an area of each electrode body, which overlaps with or projects onto an adjacent one of the electrodes in coaxial relation therewith, and where the electric field is regularly distributed and concentrated, and locates corners of each electrode body outside the overlapped area. When the electrodes are supported in spaced relation to each other using the electrically insulating posts 35, and particularly when the posts are located at corners of the polygonal electrode bodies 19, this misalignment acts to further reduce disturbance to charge distribution attributable to the posts.

Preferably, the electrodes are uniformly spaced positions along the axis 15, that is each adjacent pair of electrodes is spaced apart by a common distance. The distance or spacing between electrodes is determined by the fluid in which the apparatus will be used. Typically, the distance or spacing is based on that which, based on the prescribed voltage between adjacent electrodes, provides ionization of the fluid before dielectric breakdown thereof.

To provide satisfactory performance while minimizing production costs, the projections 25 are made of electrically conductive plastic, including for example Polylactic acid (PLA), Acrylonitrile butadiene styrene (ABS), polyamide (PA), or Polyvinylidene fluoride (PVDF). Typically, electrically conductive plastic is a composite material comprising plastics and a conductive material such as carbon black or graphite, which are combined or mixed in a prescribed ratio for electrical conductivity. While being electrically conductive, the material of the projections is preferably also of the type that is adapted for triboelectric charging. Typically, the material is selected to have a neutral triboelectric series.

It will be appreciated that the materials used for the electrode bodies 19 and projections 25 are considered electrically conductive over the operating voltage range of the source 17.

This arrangement is suited for accelerating the fluid to generate a motive force for propelling a body to which the apparatus is mounted. The one or more electrodes with projections pointed in a common axial direction cooperate to accelerate the fluid between each adjacent pair of the electrodes.

Also, this arrangement is suited for coaxially stacking multiple electrodes of a common structure to amplify the acceleration of the fluid. Additionally or alternatively, this arrangement is suited for arranging a plurality of sets of coaxially stacked electrodes one beside the other, either in a manner in which the sets are electrically isolated from each other or in a manner in which individual electrodes of distinct sets arranged in a common plane are electrically interconnected.

In addition, there is disclosed herein a method for ionizing and accelerating a fluid which comprises forming a unidirectional electric field across a plurality of planar perforated electrodes 12 and 13 arranged in parallel spaced coaxial relation, in which at least one of each adjacent pair of electrodes includes projections 25 upstanding from a planar body 19 of the electrode and in which all projections of all electrodes are pointed in a common axial direction 26 defining a direction of movement of the fluid. The direction of the electric field formed is opposite to the axial direction in which the projections point.

Of course, the electric field is provided by electrically operatively connecting a voltage source 17 to the electrodes.

As such, the fluid located within a volume bounded by the coaxially-arranged serial electrodes is ionized and accelerated in the direction 26. The accelerated ionized fluid particles pass through the apertures 22 in each electrode body 19. The accelerated fluid particles are discharged from the apparatus through the apertures of the downstream-most electrode acting as an outlet in respect of fluid movement through the apparatus. Furthermore, upon movement of the fluid within the bounded volume of the stacked electrodes, more fluid can be drawn into this volume through the apertures 22 in the upstream-most electrode acting as an inlet for fluid movement through the apparatus.

When the apparatus 10 is mounted to a body to be moved, such as a vehicle, acceleration of the fluid acts to generate a motive force to propel the body through the fluid.

Figure 9:
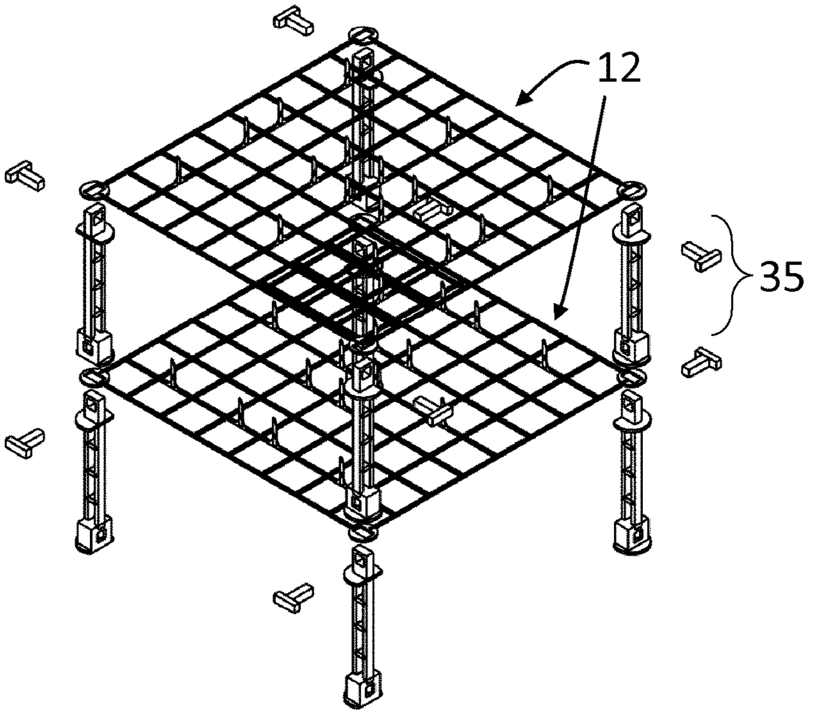
FIGS. 9-11 are exploded perspective, elevational and top plan views, respectively, of a fifth arrangement of apparatus according to the present invention, where some components are omitted for clarify of illustration.
Figure 10:
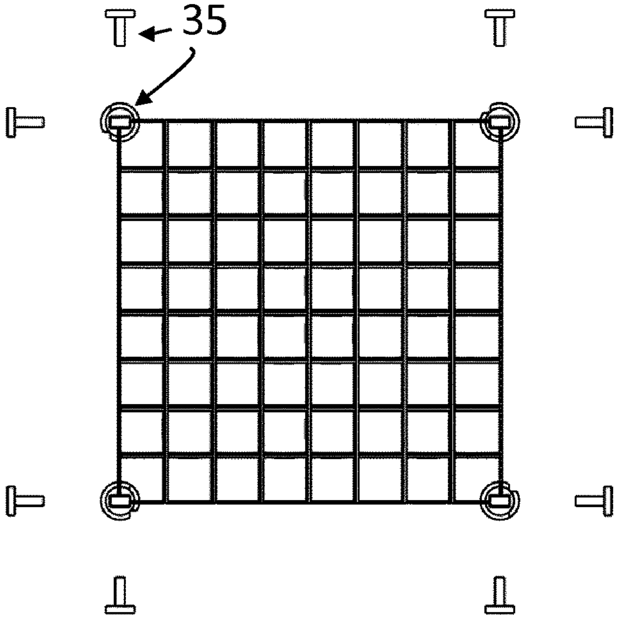
Figure 11:
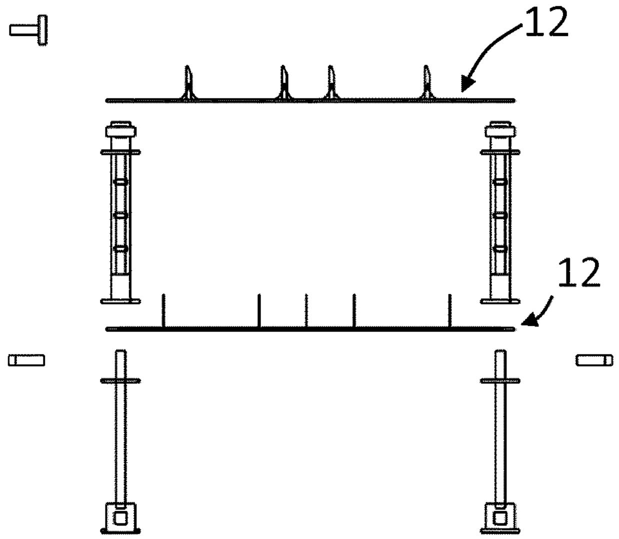
Figure 12:
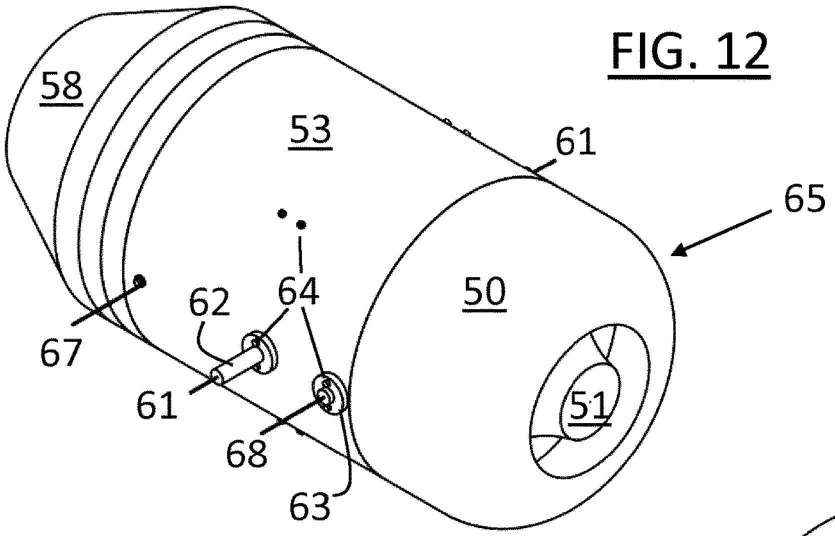
FIGS. 12-14 are perspective, rear and side views, respectively, of an ionic turbine incorporating the apparatus of the present invention.
Figure 13:
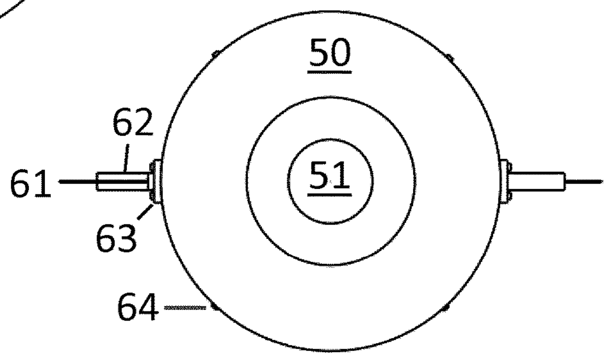
Figure 14:
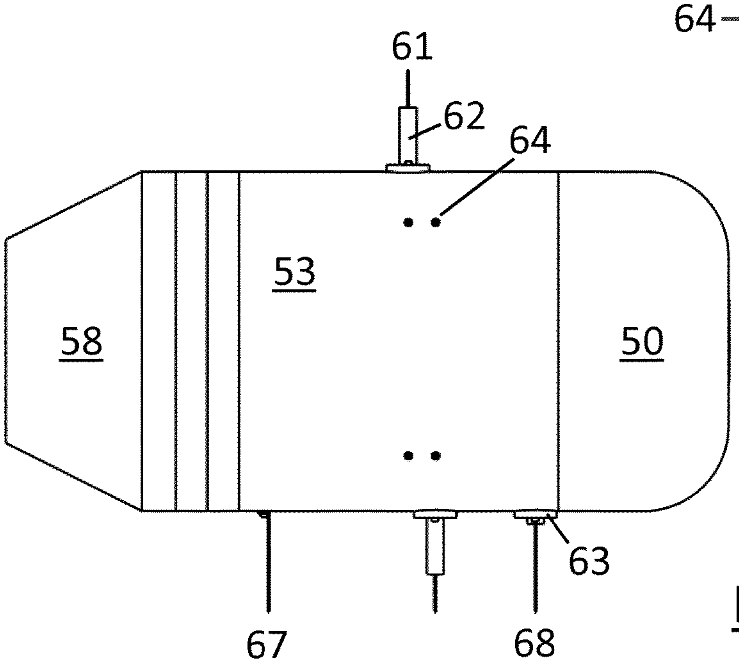
Figure 15:
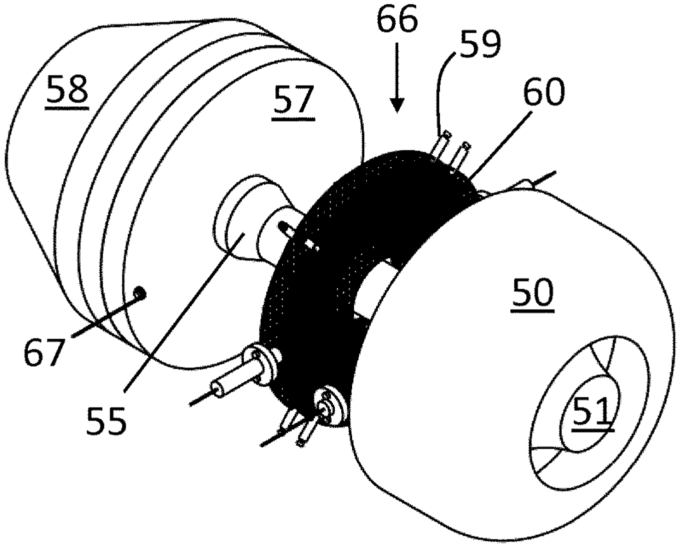
FIGS. 15-17 are perspective, rear and side views, respectively, of the ionic turbine of FIGS. 12-14 without a housing removed.
Figure 16:
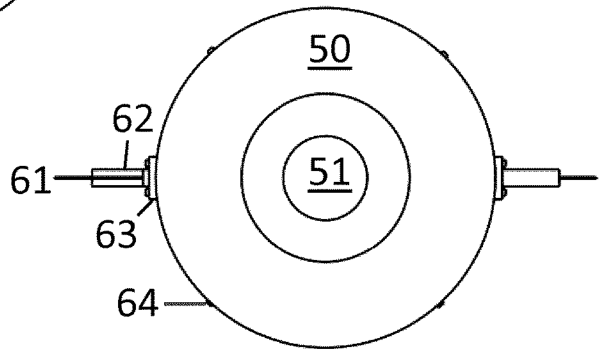
Figure 17:
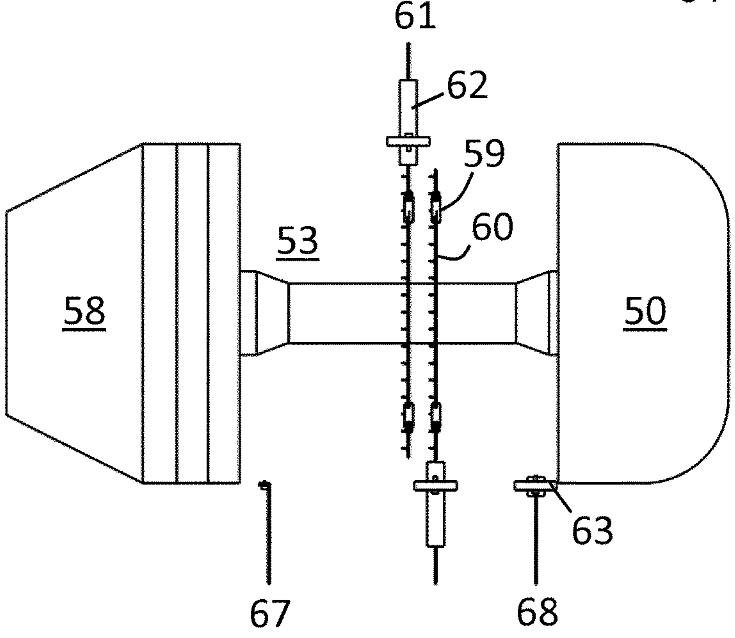
Figure 18:
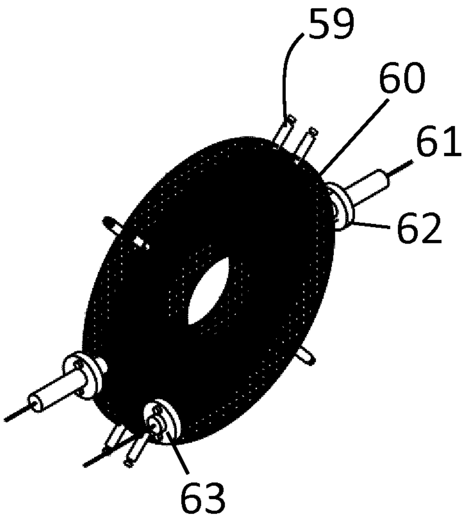
FIGS. 18-19 are perspective and end views, respectively, of an arrangement of the apparatus incorporated in the ionic turbine of FIGS. 12-14.
Figure 19:
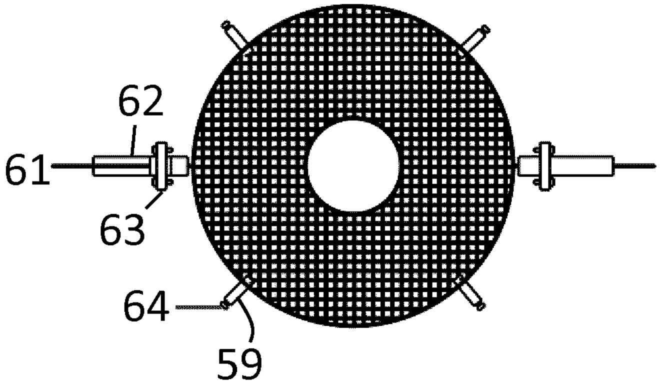

With reference to FIGS. 9-11, in one arrangement of the present invention, the apparatus comprises a cell which is made up of a pair of equally sized electrically conductive grids 19 combined with emitter geometry, that is projections 25. The cell's conductive grid-emitters are separated and supported by electrically insulating supports 35. The cell grid-emitter grids 19 are parallel to each other. One grid-emitter, specifically the upstream or leading one, has its emitters 25 pointed at and perpendicular to the opposite grid-emitter grid, specifically the downstream or trailing one. The other grid-emitter 12 has the emitters 25 pointing away from the cell grid-emitter pair, and thus pointed in a common direction as the emitters of grid-emitter 12.

A high voltage is used to produce ions at the tips 27 of the emitters 25, the ions are accelerated towards the opposite grid-emitter 13 creating a flow in the fluid medium. The air can slip through the apertures 22 of the grid topology, both at the inflow and the outflow, to continue on to be used as thrust.

In use, affix the cell using electrically insulated supports 35 to a body to be accelerated in a fluid. Attach an electric (voltage) source capable of generating a high voltage between the two conductive grid-emitters 12, 13 to generate thrust which accelerates the body.

In addition to an open system, grid-emitter motivated fluid flow can be used, as in oil filled actuators, or any closed system such as but not limited to air conditioners, or the movement of compressed gases.

Another use may be generation of, but not limited to, ozone or NO(x).

Grid-emitters can be constructed of any electrically conductive or semiconductor material which can be, but is not limited to, a solid, 3d printed or other manufacturing technique, conductive plastic, superconductive, or having a poorly/not conductive core which is painted with conductive paint, plated with conductive material, gilded, etc.

Instead of rigid, a grid-emitter can be made of a material with flex such as, but not limited to, a conductive plastic.

Grid-emitter grid geometry can be of varying width, length and height. Grid wire diameters can be the same throughout or of varying sizes. Grid wire cross-section can be a shape, such as but not limited to; round, square, rectangular, etc. Grid-emitter emitter geometry can be of varying size as long as the emitter is pointed/has an edge (single or multiple points or tappers, in various geometries) and there is a gap between the emitter(s) and the other grid-emitter. Number and arrangement of emitters can vary. Instead of a 10 mm aperture, aperture of grid can be of larger, smaller and varying sizes.

Gap distance between grid-emitters can be varied, set statically and/or dynamically, depending on the performance characteristics and specifications for a particular application such as, but not limited to, shorter gap in a higher density fluid or fluid with a higher dielectric breakdown voltage relative to another fluid.

Insulating supports can be of varying sizes and shapes. Support connections to grid-emitters can be axial to the flow of fluid, radial, orthogonal to any side, or other types of arrangements as well can use various connection types such as, but not limited to; compliant mechanisms, snap-to, post hole and peg, screw and screw hole, etc.

Instead of both grid-emitters in a cell being of equal size they can be of differing sizes.

Voltage potential to generate thrust from a grid-emitter pair (cell) can be of opposite sign (positive to negative or negative to positive), or positive/negative to ground/com-, etc. Any power source such as, but not limited to, a zvs circuit with any voltage multiplier circuit (optional) powered by city utility grid, chemical battery, fuel cell, solar cell, or any other electric source. Voltage applied to the cell grid-emitters can be AC of any frequency or DC. Any voltage difference of sufficient amount to cause a thrust can be used.

Instead of +/−30 kv voltage applied to a grid-emitter, any voltage difference that can generate a thrust can be used.

Instead of grid-emitters being parallel to each other and being straight they can be curved and parallel such as but not limited to two grid bowls one sitting within the proximity of the other along the flow axial direction.

Grid can be curved or straight such as, but not limited to, grid wires that are parallel-and-perpendicular hatching, or convergent/divergent (circular-and-radial grid pattern).

Instead of a single cell, as shown for example in FIG. 1, cells can be stacked vertically and/or horizontally using insulating supports, as shown for example in FIG. 4.

Instead of atmospheric pressure, cells can operate in lower and higher pressure fluids such as, but not limited to, the high pressure area inside a radial turbine. Cells can operate at lower and higher temperatures with construction utilizing suitable higher or lower temperature tolerant materials such as, but not limited to, silicon nitride for supports and titanium for grid-emitter when cell is operating in a fluid at a temperature under 1200 degrees Celsius.

The combustion chamber for a turbine, such as, but not limited to, a turbojet, turboprop, and turbofan can be integrated with and/or replaced with a chamber to house grid-emitter cell(s) to allow the cell(s) to produce higher efficiency thrust from the compressed higher pressure air.

A fluid can be supplied to a cell(s) to produce thrust in a vacuum, such as in, but not limited to the vacuum of space.

Instead of a grid-emitter pair (cell) a single grid-emitter can be used as an emitter or collector (or both) of charges with any other conductor in any other shape to generate ions, collect charges and produce fluid flow (including but not limited to a conductive fluid that creates a sufficient voltage potential to a grid that is partially or fully immersed). A single grid-emitter can be used to repel or attract fluids that are electrically charged and also mix fluids that are charged with those that are not.

A single grid-emitter can be used in conjunction with a cell such as but not limited to a grounded grid-emitter at the outflow of fluid from a cell to further reduce or eliminate charges in the outflow fluid.

As previously mentioned, the apparatus 10 may be incorporated in a turbine in substitution of a conventional combustion chamber thereof.

FIGS. 12 to 19 relate to an embodiment of an ionic turbine 65 comprising a turbine where the combustion chamber is replaced by one or more supported and affixed cells 66 inside the housing 53. The cell(s) 66 are arranged and spaced axially along and around the turbine shaft and shaft support 55 with the emitters pointing towards the exhaust turbine and exhaust flow guide 57. The conductive parts of the cells 66 are isolated from all parts of the turbine 65 with the only contact being with the electrically insulated supports 59.

Two or more insulated electrodes 61 enter the turbine 65 cell 66 area via holes in the housing 53 and are attached one to each grid-emitter 60 in a cell 66. The electrode insulated fitting 62 entry points are sealed for heat and pressure. A grounding wire 67 is attached to the housing 53. One or more pressure and temperature sensors 63 enter the cell 66 area via holes in the housing 53 which are sealed for heat and pressure. All or some combination of sensors 63 and sensor wires 68 are used, but not limited to, determining safe levels of voltage to apply to the insulated electrodes 61. Grounding wire 67 can be used to determine any electrical arcing or dissipation to the turbine 65 from the cell(s) 66 that should be electrically insulated from the turbine 65. Grounding wire 67 allows for an electrical path for any unintended electrical shorting and the elimination of possible static build up. The sensors 63 and grounding wire 67 sensing can be used with an electronic setup to determine present and predictive future state of turbine 65 and cells 66, and to take action as needed, such as, but not limited to, varying the voltage to the electrodes 61.

Voltage is provided by, but not limited to, an electrically insulated zero voltage switching (ZVS) circuit with voltage multiplier circuit.

To use: Affix the turbine 65 to a body to be accelerated in a fluid. Attach an electric source capable of generating a high voltage between the two or more electrodes 61. Attach the ground wire 67 to a ground source. Ionic airflow caused by the cell(s) 66 pulls fluid through the turbine 65, causing the turbine wheels to turn, which causes the fluid, such as, but not limited to, air to become compressed. Due to Paschen's law, an increase in fluid pressure can create an increase in breakdown voltage for the fluid, so the compressed air allows for the voltage and power to be increased which causes more air to be pulled through by the cell(s) 66, which causes the turbine wheels to turn faster, causing the fluid pressure to rise further. The pressure rise can be controlled by the voltage and power amounts using a suitable electronics setup, such as, but not limited to, a circuit with a potentiometer to manually adjust voltage or a micro-controller adjusted voltage. A pressure sensor 63 can be used to determine operating voltage.

In one embodiment the insulated circuit that provides power to the cell can be attached near or on to the housing of the ionic turbine thereby shortening the electrode lengths to the cell or in another embodiment as a separated member with longer electrodes to the cell.

Instead of the turbine wheels being spun up by the cell(s) alone, a starter motor can be used to spin up to a desirable RPM before applying voltage to the cell(s) which then take over as the starter motor disengages from the turbine wheels.

Another embodiment of an ionic turbine can work without a ground wire.

Instead of a single stage which houses cell(s), a dual stage ionic and combustion chamber, in any order, or a multistage combination of one or more overlapping or separated ionic and/or combustion stages.

In addition, a sensor wire can be attached to the turbine housing to determine if ground wire is connected.

Another embodiment includes a turboshaft for power generation.

An ionic turbine can be of various width, length and height.

Another set of embodiments includes a turbojet, turboprop, or turbofan with combustion chamber replaced with cell(s), electrodes and sensor(s).

Instead of using a centrifugal compression wheel any open system compression method can be used such as, but not limited to, axial.

Different embodiments of an ionic turbine can have different shapes such as, but not limited to, oval cross-section or cylindrical.

Another use is the flow of a fluid in a closed system such as in a coolant system.

Instead of materials used in the construction of gas turbines, some embodiments of ionic turbines can make use of materials with lower temperature tolerance such as, but not limited to, aluminum for the housing and other parts.

Grid-emitters can be attached by various insulated support geometries and connection methods.

Instead of a circular grid cross-section for a grid-emitter they can be of another shape such as, but not limited to, a square, oval, octagon, etc.

Grid-emitters can be placed such as to, but not limited to, be closer to the compressor wheel, closer to the exhaust wheel or anywhere in-between. The distance between grid-emitters can vary.

Grid-emitters grid sizes can be of various sizes.

Instead of a single cell, any number of cells can be used to provide thrust inside the cell housing.

Instead of a cell that encompasses the shaft or shaft support, any number of cells can be adjacent to the shaft or shaft support as long as the cell are kept electrically isolated from the other parts of the turbine.

Instead of, or in addition to, a pressure sensor, other sensors can be used to provide feedback to electronic control circuits such as, but not limited to, temperature, humidity, revolutions, etc.

The scope of the claims should not be limited by the preferred embodiments set forth in the examples but should be given the broadest interpretation consistent with the specification as a whole.

The invention claimed is:

1. An apparatus for ionizing a fluid and accelerating the fluid in a movement direction of the fluid comprising:

a plurality of electrodes disposed in the fluid where the electrodes are generally transverse to the direction of movement, in generally parallel relation to each other at spaced positions along the movement direction;

the electrodes including a first electrode and a second electrode which is downstream-most and downstream of the first electrode;

wherein each of the electrodes comprises a body which is electrically conductive and has a first side facing in the movement direction and a second side facing opposite to the movement direction;

wherein each of the electrodes includes a plurality of apertures from the first side to the second side to allow passage of the fluid therethrough in the movement direction;

support components mounting the electrodes in the fluid;

a voltage source electrically connected to the electrodes to form an electric field therebetween along the movement direction for ionizing the fluid;

wherein at least one of the electrodes includes a plurality of electrically conductive projections electrically coupled to said at least one electrode and extending in a common direction along said movement direction from the first side of the body of said at least one of the projections to tips of the projections in spaced relation to the first side;

wherein the projections are arranged at spaced positions across the first side of said at least one of the electrodes;

wherein both said first and second electrodes include said electrically conductive projections on said first face thereof.

2. The apparatus of claim 1 wherein the electrodes include a first set of the electrodes and a second set of the electrodes arranged in the fluid downstream of the first set;

the first set of electrodes including a first electrode and a second electrode which is downstream of the first electrode;

the second set of electrodes including a first electrode and a second electrode which is downstream of the first electrode;

the first set of electrodes including a voltage source electrically connected across the first and second electrodes of the first set to form an electric field of a predetermined polarity therebetween along the movement direction for ionizing the fluid;

the second set of electrodes including a voltage source electrically connected across the first and second electrodes of the second set to form an electric field of said predetermined polarity therebetween along the movement direction for ionizing the fluid;

the second electrode of the first set being arranged adjacent to and upstream of the first electrode of the second set to form an electric field therebetween in a polarity opposite to said predetermined polarity.

3. The apparatus of claim 1 wherein said support components mounting the electrodes in the fluid comprise:

a first set of support components mounting the first electrode in the fluid where the components of the first set of components are arranged at angularly spaced positions around an axis along the movement direction;

a second set of support components mounting the second electrode in the fluid where the components of the first second of components are arranged at angularly spaced positions around an axis along the movement direction;

wherein the support components of the first set of components are angularly offset around the axis relative to the support components of the second set of components.

4. The apparatus of claim 1 wherein the projections are made of material adapted for triboelectric charging.

5. The apparatus of claim 1 wherein the projections are made of electrically conductive plastic.

* * * * *